US009170562B2

(12) United States Patent
Shimada et al.

(10) Patent No.: US 9,170,562 B2
(45) Date of Patent: Oct. 27, 2015

(54) HOLOGRAPHIC MEMORY DEVICE AND REPRODUCTION/RECORDING METHOD

(75) Inventors: Kenichi Shimada, Yokohama (JP); Toshiki Ishii, Yokohama (JP)

(73) Assignee: HITACHI CONSUMER ELECTRONICS CO., LTD., Tokyo (JP)

(*) Notice: Subject to any disclaimer, the term of this patent is extended or adjusted under 35 U.S.C. 154(b) by 494 days.

(21) Appl. No.: 13/093,896

(22) Filed: Apr. 26, 2011

(65) Prior Publication Data

US 2011/0273754 A1 Nov. 10, 2011

(30) Foreign Application Priority Data

May 10, 2010 (JP) ................................ 2010-107854

(51) Int. Cl.
 *G03H 1/12* (2006.01)
 *G03H 1/22* (2006.01)
 *G11B 7/1369* (2012.01)
 *G11B 7/1392* (2012.01)
 *G11B 7/0065* (2006.01)

(52) U.S. Cl.
 CPC . *G03H 1/12* (2013.01); *G03H 1/22* (2013.01); *G03H 1/2286* (2013.01); *G11B 7/1369* (2013.01); *G11B 7/13927* (2013.01); *G03H 2222/35* (2013.01); *G03H 2222/56* (2013.01); *G11B 7/0065* (2013.01)

(58) Field of Classification Search
 CPC ............. G03H 1/12; G03H 1/22; G03H 1/10; G03H 1/2286; G03H 1/0402; G03H 1/0486
 USPC .......................... 359/1–35; 250/550; 369/103, 369/44.32–44.33, 112.01–112.02; 349/2, 349/193
 See application file for complete search history.

(56) References Cited

U.S. PATENT DOCUMENTS

| | | | |
|---|---|---|---|
| 5,886,800 A * | 3/1999 | Aprahamian et al. | ........ 359/16 |
| 5,909,333 A | 6/1999 | Best et al. | |
| 7,092,133 B2 | 8/2006 | Anderson et al. | |
| 7,755,819 B2 | 7/2010 | Uno et al. | |
| 2009/0073850 A1 * | 3/2009 | Ide et al. | ........ 369/103 |

FOREIGN PATENT DOCUMENTS

| | | |
|---|---|---|
| CN | 101263434 | 9/2008 |
| JP | 2004-272268 | 9/2004 |
| JP | 2009-086248 | 4/2009 |

OTHER PUBLICATIONS

Tetsuhiko Muroi et al., Optical Compensation of Distorted Interference Fringes Depending on Temperature in Holographic Data Storage, ISOM 2009 Technical Digest, TH-J-05.
Office Action in connection with corresponding Chinese Application No. 201110107405.1, dated May 5, 2014.

* cited by examiner

*Primary Examiner* — Stephone B Allen
*Assistant Examiner* — Kimberly N Kakalec
(74) *Attorney, Agent, or Firm* — Baker Botts L.L.P.

(57) ABSTRACT

An optical beam with the same amplitude distribution and phase distribution as those of the signal beam used for recording is radiated to the hologram recording medium via an optical system of the signal beam prior to reproduction so that the optical beam with the amplitude and phase of the reference beam upon recording is generated through diffraction. A wavefront sensor detects the wavefront configuration of the diffraction beam and obtains preliminarily the suitable wavefront of the reference beam for reproduction. The wavefront control element preliminarily corrects the wavefront of the reference beam to an optimum wavefront.

6 Claims, 9 Drawing Sheets

HOLOGRAPHIC MEMORY DEVICE AND REPRODUCTION/RECORDING METHOD

CLAIM OF PRIORITY

The present application claims priority from Japanese patent application serial No. JP 2010-107854, filed on May 10, 2010, the content of which is hereby incorporated by reference into this application.

BACKGROUND OF THE INVENTION

1. Field of the Invention

The present invention relates to an apparatus for recording information in an optical information recording medium using holography, and/or for reproducing the information from the optical information recording medium.

2. Description of the Related Art

Recently, standard of Blu-ray Disc using blue-violet semiconductor laser has realized commercialization of optical disc with recording density of approximately 50 GB in the consumer market. The optical disc is highly demanded to have capacity as large as that of the HDD (Hard Disc Drive) with size ranging from 100 GB to 1 TB.

However, new type storage technology that is different from the one using short wavelength and objective lens with large NA is required for the purpose of realizing the super-dense optical disc.

There has been a trend to study storage technology for next generation, and the holographic recording technology for recording digital information using holography has been focused.

The holographic recording technology is used for recording information by generating a refractive-index modulation in the recording medium using an interference pattern generated by overlapping a signal beam which contains page data information two-dimensionally modulated by a spatial light modulator and a reference beam within the recording medium.

Upon reproduction of the information, when radiating the reference beam used for recording to the recording medium in the same arrangement, the hologram serves as a diffraction grating to generate diffraction beam in accordance with the interference pattern recorded in the recording medium. The diffraction beam is recovered as the same beam as well as the recorded signal beam and the phase information.

The recovered signal beam is two-dimensionally detected at high speeds by a photodetector such as CMOS and CCD. The holographic recording technology allows the single hologram to perform simultaneous recording/reproduction of the two-dimensional information and a plurality of page data to be overwritten at the same location. It is therefore effective for recording/reproduction of the information with large capacity at high speeds.

Japanese Unexamined Patent Publication No. 2004-272268 (Patent Document 1) discloses the holographic recording technology. The document describes the angular multiplexing recording method in which signal light flux is condensed on the optical information recording medium using a lens, and simultaneously, the reference beam of parallel light flux is radiated for interference so as to record the hologram. Then multiplexing recording is performed by displaying different page data on the spatial light modulator while changing the incident angle of the reference beam to the optical recording medium.

Japanese Unexamined Patent Publication No. 2009-86248 (Patent Document 2) and the material titled "Optical Compensation of Distorted Interference Fringes Depending on Temperature in Holographic Data Storage," ISOM 2009 Technical Digest, TH-J-05 (Non-Patent Document 1) disclose the technology for improving quality of the hologram reproduced image.

SUMMARY OF THE INVENTION

As described in Patent Document 2 and Non-Patent Document 1, correction of wavefront aberration of the reference beam is very important for obtaining high quality hologram reproduced image. In consideration of the response of the intensity distribution of the hologram reproduced image with respect to the input signal for wavefront correction when correcting the reference beam wavefront, the response generally becomes non-linear as described in Patent Document 2. As it is difficult to execute feedback control using transfer function, the control using genetic algorithm is executed for correcting the wavefront aberration of the reference beam as disclosed in Patent Document 2. The genetic algorithm provides the method for searching solution by selecting the substance with higher adaptability preferentially from a plurality of "substances" as possible solutions while repeating such operation as crossing, recombining, and mutation evolution. In other words, the aforementioned repetitive process executed a plurality of times is required in principle to search for the wavefront configuration as the optimum solution. A certain length of time is required to search the optimum solution in the process for radiating the reference beams with different wavefronts a plurality of times. In order to accelerate the data transfer speed of the apparatus, configuration of the optimum wavefront aberration has to be detected for a short period.

It is an object of the present invention to correct the reference beam wavefront for relatively a short period.

For example, the wavefront of the diffraction beam obtained by radiating the beam with the predetermined complex amplitude distribution to the hologram may be detected. Then correction of the reference beam wavefront may be performed for relatively a shorter period.

BRIEF DESCRIPTION OF THE DRAWINGS

These and other features, objects and advantages of the present invention will become more apparent from the following description when taken in conjunction with the accompanying drawings wherein.

DESCRIPTION OF THE PREFERRED EMBODIMENTS

Exemplary embodiments of the present invention will be described.

First Embodiment

Figure 1:
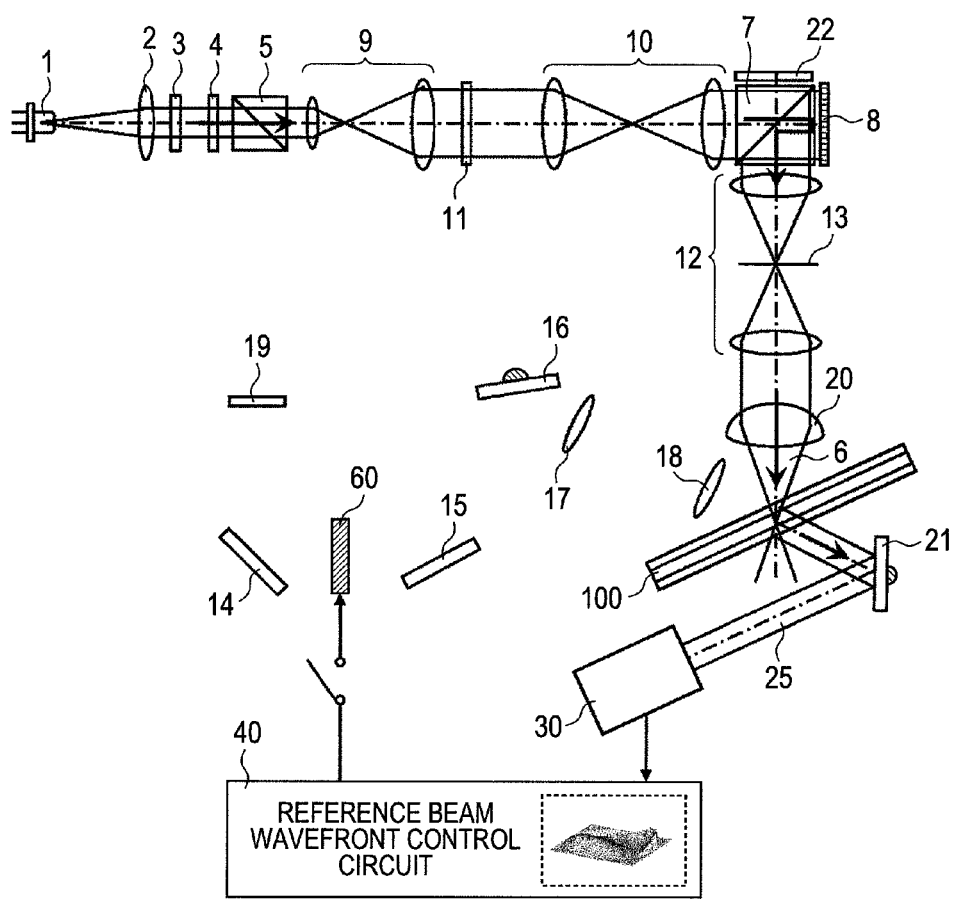
FIG. 1 is a schematic view showing a holographic memory device according to an exemplary embodiment.

FIG. 1 shows a holographic memory device according to an exemplary embodiment of the present invention.

Prior to reproduction of information from a hologram recording medium 100 which records the information, an optical beam emitted from a laser light source 1 is made incidence to a spatial light modulator 8 via a collimated lens 2, a shutter 3, a polarizing direction conversion element 4, a PBS prism 5, a beam expander 9, a phase mask 11, a relay lens 10, and a PBS prism 7. At this time, amplitude distribution and phase distribution of the optical beam modulated by the spatial light modulator 8 and the phase mask 11 are set to be the same as those of a signal beam from the reference beam and the signal beam which have been used for recording the information in the hologram recording medium 100. The modulated optical beam is made incidence to the hologram recording medium 100 via a relay lens 12, a spatial filter 13 and an objective lens 20.

As described above, the optical beam is modulated so that the phase and the amplitude distributions are the same as those of the signal beam upon recording of the information partially or fully, and the optical beam 6 is radiated from the signal beam optical system to the hologram recording medium 100 which records the information to diffract the optical beam using the hologram within the hologram recording medium 100. The diffraction beam has the same amplitude and phase distributions as those of the reference beam used for recording the information in the hologram recording medium 100 according to holography principle. Normally, when reproducing the information from the holographic memory, the reference beam is radiated to the hologram recording medium 100 to generate the optical beam with the same amplitude and phase as those of the signal beam upon recording through diffraction. According to the exemplary embodiment, the signal beam used for recording is radiated to the hologram recording medium 100 to generate the optical beam with the amplitude and phase of the reference beam used for recording through diffraction. In the holographic memory in an ideal condition, when reproducing the information, the same reference beam as the one upon recording is radiated to detect the signal beam. If the wavefront of the reference beam upon reproduction is largely different from the one upon recording, quality of the signal beam to be reproduced is degraded or it cannot be reproduced. In the exemplary embodiments, diffraction allows generation of the optical beam with the amplitude and phase of the reference beam used for recording through diffraction. So the wavefront of the reference beam suitable for reproduction may be preliminarily detected prior to reproduction.

According to the embodiment, a diffraction beam 25 passing through a galvanic mirror 21 is received by a wavefront sensor 30 to detect the wavefront configuration.

The wavefront configuration data detected by the wavefront sensor 30 are transmitted to a reference beam wavefront control circuit 40. When reproducing the information from the hologram recording medium 100, the reference beam wavefront is controlled by a wavefront control element 60 based on the wavefront configuration data.

The wavefront control element 60 may be realized by a liquid crystal element for applying voltage to add a predetermined phase pattern to the optical beam.

Figure 2:
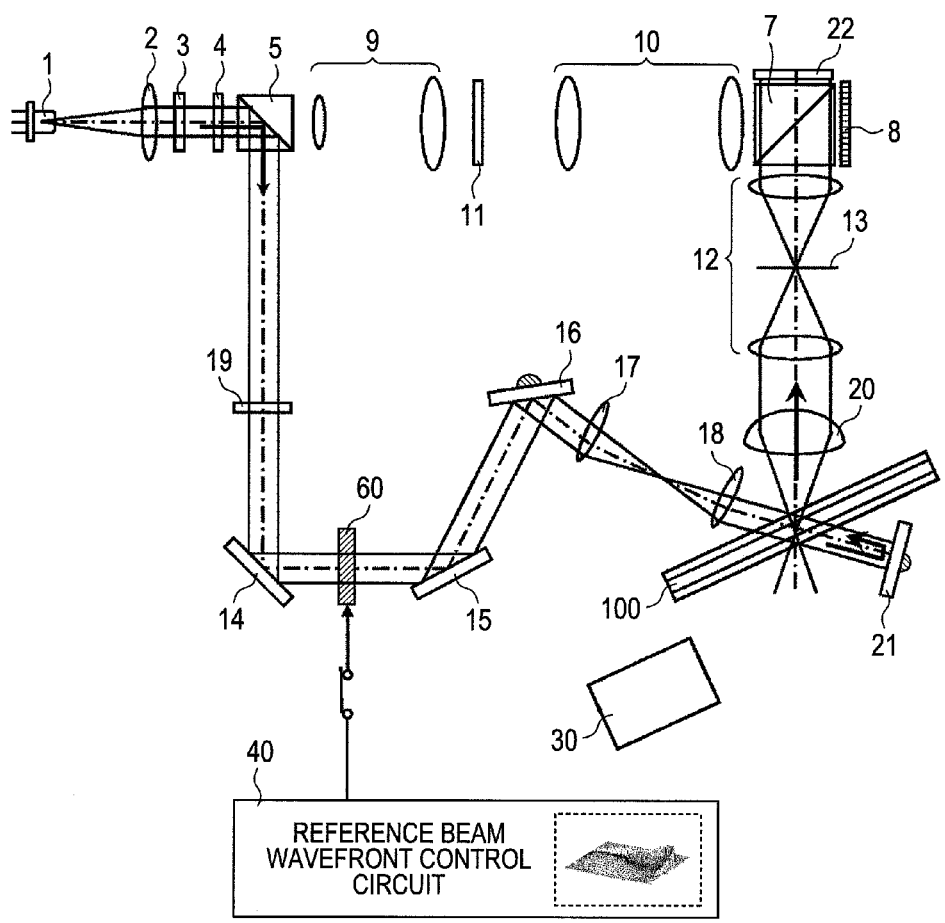
FIG. 2 is a view showing a holographic memory device for correcting a reference beam wavefront according to an exemplary embodiment.

FIG. 2 schematically shows reproduction of the information from the hologram recording medium 100. The optical beam emitted from the laser light source 1 is made incidence to the hologram recording medium 100 via the collimated lens 2, the shutter 3, the polarizing direction conversion device 4, the PBS prism 5, the polarizing direction conversion device 19, the mirror 14, the wavefront control element 60, the mirror 15, the galvanic mirror 16, the lenses 17 and 18. The optical beam is made incidence to the hologram recording medium 100 as the reference beam.

As described referring to FIG. 1, the information of the reference beam wavefront (phase) suitable for reproduction has been already detected. Upon reproduction, the reference beam wavefront is corrected by the wavefront control element 60 via a reference beam wavefront aberration control circuit. At this time, the wavefront aberration of the reference beam is corrected in consideration of the initial wavefront configuration before correction. That is, the wavefront configuration detected by the wavefront sensor 30 is not just added to the reference beam upon reproduction, but added in consideration of the initial wavefront configuration before correction. According to the embodiment, when reproducing the optical beam reflecting from the galvanic mirror 21 as the reference beam, the wavefront (phase) is added so that the optical beam becomes phase conjugate beam in consideration of inversion of the wavefront owing to reflection.

Second Embodiment

Figure 3:
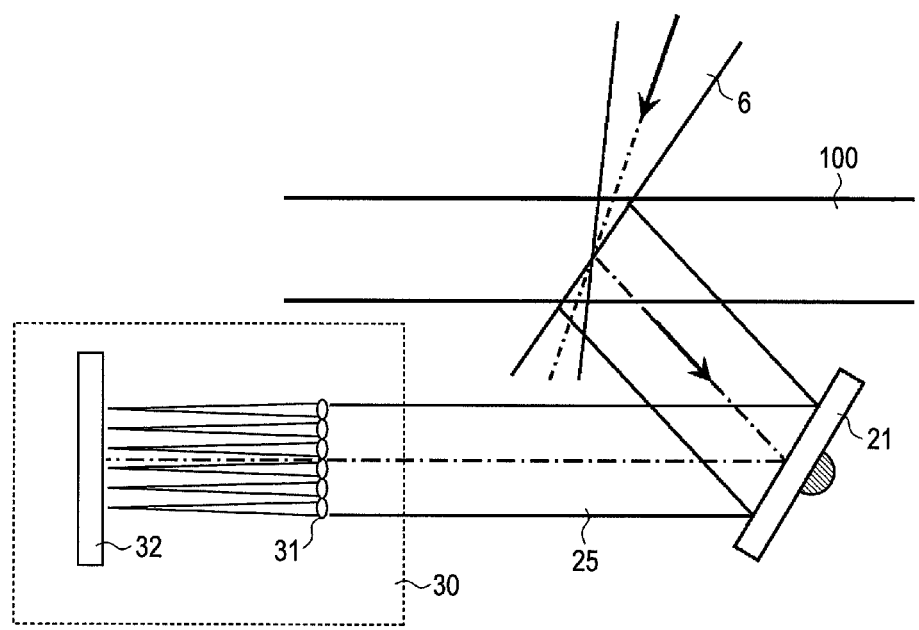
FIG. 3 shows a wavefront sensor according to an exemplary embodiment.

FIG. 3 shows the wavefront sensor 30 of the holographic memory device according to an exemplary embodiment of the present invention. The holographic memory device has the same structure as the one shown in FIG. 1.

Figure 4:
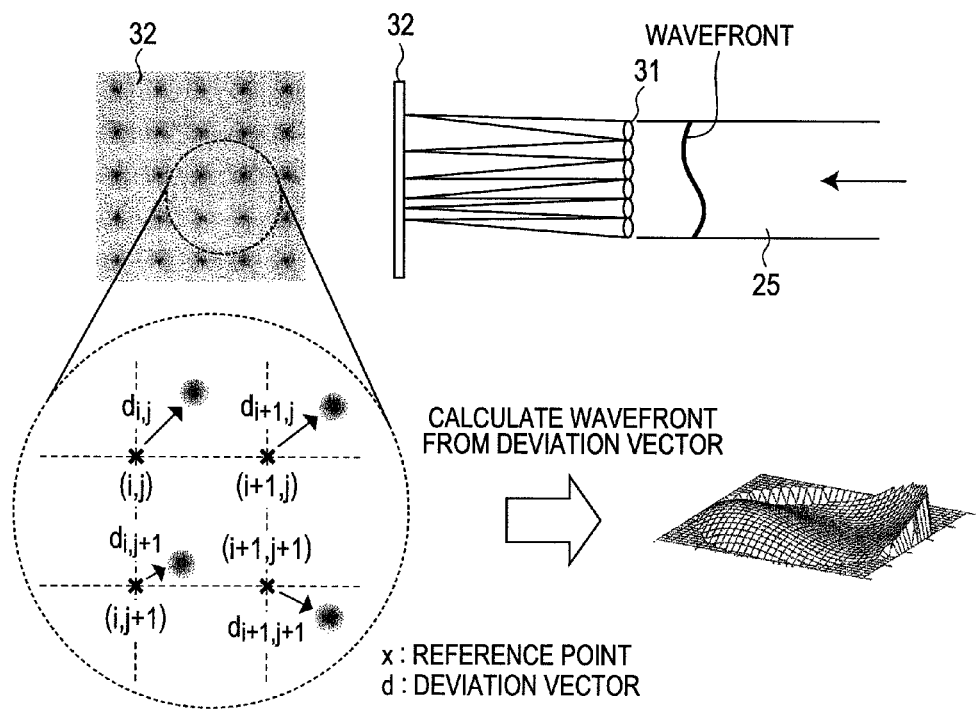
FIG. 4 shows calculation of the wavefront configuration according to an exemplary embodiment.

Referring to FIG. 3, the wavefront sensor is mainly formed of a lens array 31 and a light receiving surface 32. The diffraction beam 25 is condensed by the lens array 31, and the resultant condensing pattern is detected by the light receiving surface 32. As FIG. 4 shows, if the wavefront which is made incidence to the wavefront sensor 30 is distorted, the condensing point at which the beam is condensed by the respective lenses in the lens array is condensed in accordance with the wavefront distortion. Specifically, the beam is condensed on the line extended from normal of the wavefront which is made incidence to the lenses. For example, assuming that the condensing point upon incidence of the plane wave is set as a reference point, the condensing point on the light receiving surface 32 while having the wavefront distorted may be formed at the position different from the reference point as described in the drawings.

It is easily understood that the deviation is uniquely determined by each focal distance of the lenses of the lens array, slope direction and gradient of the wavefront which is made incidence to the respective lenses. The wavefront configuration of the optical beam 25 may be calculated by detecting the deviation vector. In the exemplary embodiment, the thus detected wavefront configuration data are transmitted to the reference beam wavefront control circuit 40. When reproducing the information from the hologram recording medium 100, the wavefront of the reference beam is corrected by the wavefront control element 60 based on the wavefront configuration data.

The lens array structure is described as the wavefront sensor in the exemplary embodiment. However, arbitrary structure may be employed as the wavefront sensor so long as the information with respect to the wavefront configuration is obtained.

Third Embodiment

Figure 5:
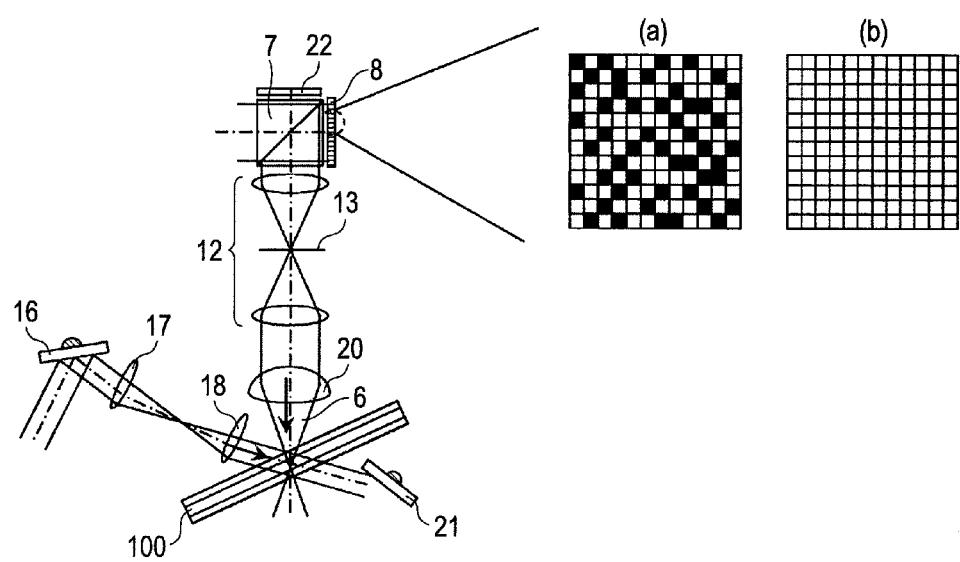
FIG. 5 shows amplitude patterns of a signal beam upon recording according to an exemplary embodiment.

FIG. 5 shows intensity distribution patterns of the signal beam upon recording in the holographic memory device according to an exemplary embodiment. The holographic memory device has the same structure as the one shown in FIG. 1. FIG. 5(a) represents recording of the two-dimensional data having ON pixels and OFF pixels appropriately arranged at least once. FIG. 5(b) represents recording of a white pattern having all the pixels set ON at least once. The term two-dimensional data shown in FIG. 5(a) having the pixels appropriately arranged denotes the two-dimensional pattern immune to the wavefront aberration. In the embodiment, the pattern is not limited to the one as described above. Data pattern to be actually recorded through modulation, or random two-dimensional data pattern may also be employed.

In the structure according to the present invention, the signal beam used for recording is radiated to the hologram recording medium 100 to generate the optical beam with the amplitude and phase used for recording through diffraction as described in the first embodiment. In other words, the amplitude distribution and the phase distribution of the signal beam for recording have to be preliminarily obtained.

In the embodiment, as FIG. 5(a) shows, the signal beam which contains a predetermined two-dimensional patterns is used for recording at least once. Alternatively, as FIG. 5(b) shows, the signal beam with the white pattern is used for recording at least once. The signal beam with the known pattern is buried to help radiation of the signal beam with the same pattern as that for recording even in the case where the device for reproduction is different from that for recording.

The timing and position for recording the two-dimensional pattern as shown in FIG. 5(a) and the white pattern as shown in FIG. 5(b) (hereinafter referred to as adjusting pattern for adjusting the reference beam) will be described.

Figure 8:
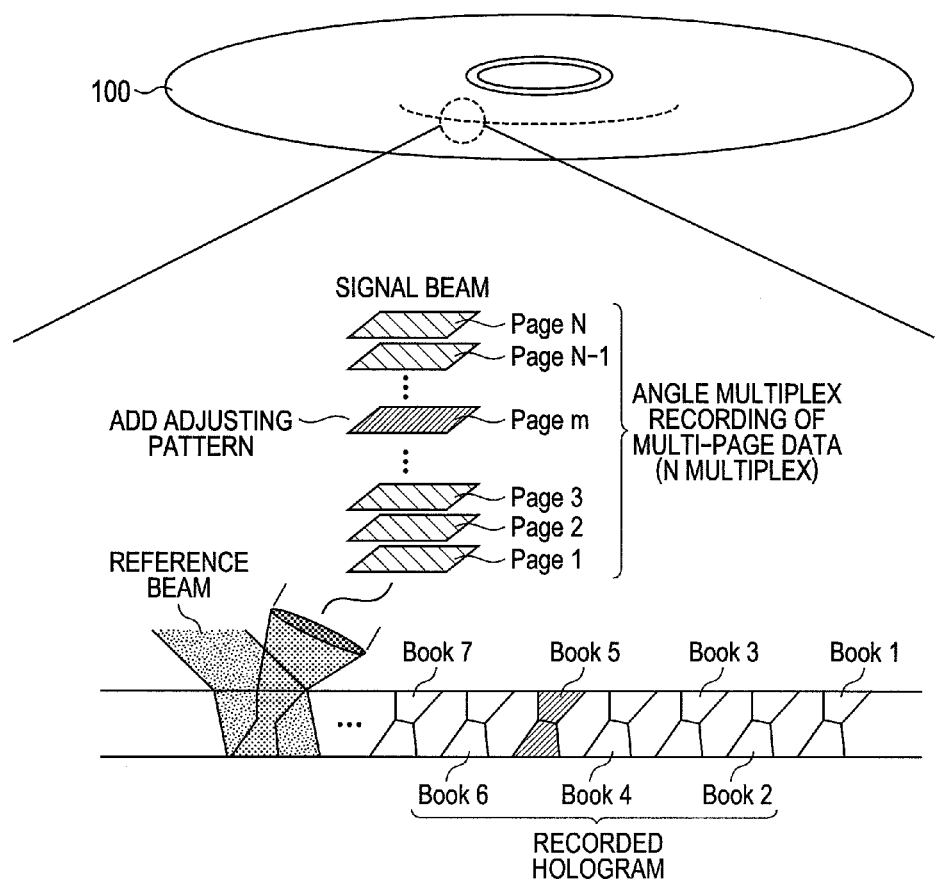
FIG. 8 shows a recording position of an adjusting pattern.

FIG. 8 represents angular multiplexing recording in the recording medium 100 with the multiplex number N. When recording, a plurality of page data (page 1 to page N) are recorded as hologram at the same position through angular multiplexing. Subsequent to the end of recording at the position, the data will be recorded at the next position. The aggregate of the angular multiplexed holograms at the same position will be referred to as "book". Each book contains information of N page data. When recording of one book is finished, the next book is recorded at the different position of the recording medium 100. According to the present invention, the adjusting pattern as described above is added to the predetermined page data (Page m) within the book as shown in FIG. 8. The pattern may be added to not only one page but also a plurality of pages in the book. The adjusting pattern may be held in some of the books recorded in the recording medium 100 (Book 5 shown in FIG. 8), or held in all the books.

Figure 9:
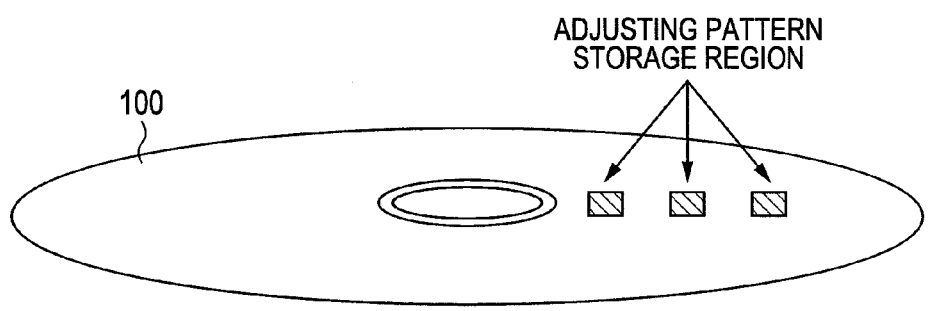
FIG. 9 shows a recording position of the adjusting pattern.

At least one predetermined region is set in the recording medium 100 for storing the adjusting pattern in the region as shown in FIG. 9.

Figure 6:
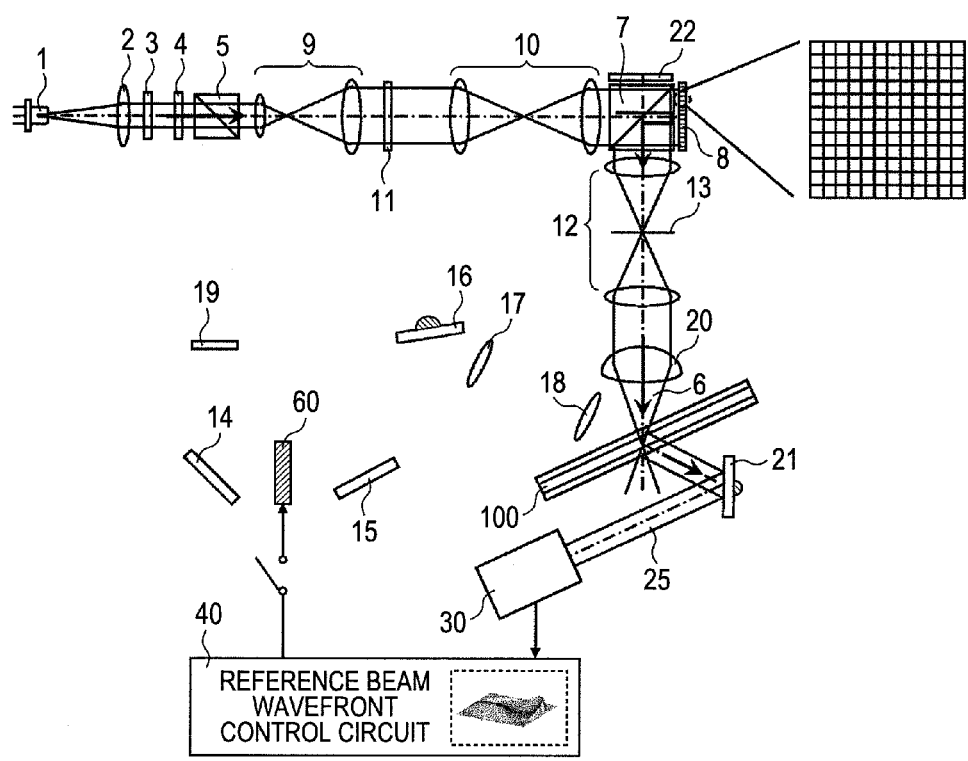
FIG. 6 shows a holographic memory device according to an exemplary embodiment.

FIG. 6 represents radiation of the optical beam with the white pattern from the signal beam optical system to the hologram recording medium 100 which records information. The hologram recording medium 100 may be configured to preliminarily record using the signal beam with the white pattern so that the optical beam with the same amplitude and phase as those of the reference beam for recording is generated by the hologram in the hologram recording medium 100 through diffraction.

The signal beam with arbitrary two-dimensional pattern may be regarded as a part of the signal beam with the white pattern. From the principle of holography, radiation of the white pattern to the region allows at least diffraction of the optical beam with the same amplitude distribution and phase distribution as those of the reference beam for recording even if the signal beam with predetermined two-dimensional pattern is used for recording. The white pattern may be radiated to detect resultant diffraction beam so as to obtain the wavefront of the reference beam suitable for reproduction.

Fourth Embodiment

Figure 7:
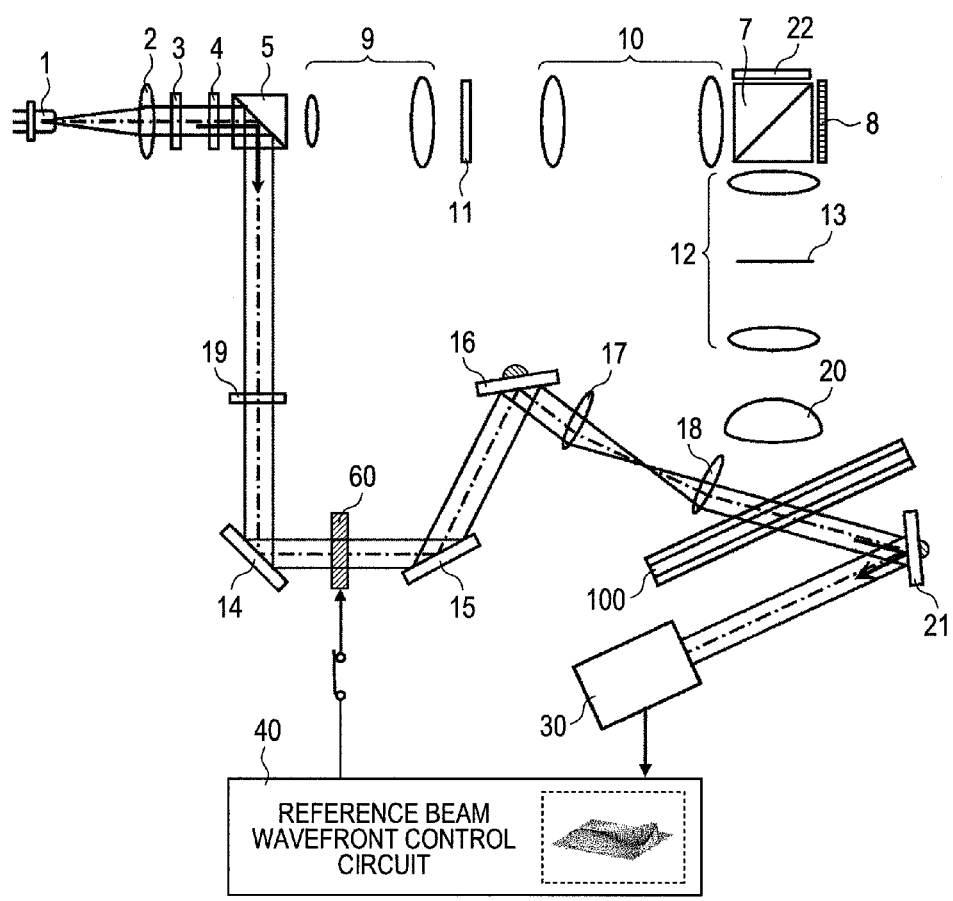
FIG. 7 shows a holographic memory device for correcting the reference beam wavefront according to an exemplary embodiment.

FIG. 7 represents correction of the wavefront aberration of the reference beam before recording and/or reproduction in the holographic memory device according to an exemplary embodiment.

Under the ideal condition of the holographic memory, if the reference beam wavefront upon reproduction is largely different from the one upon recording, quality of the signal beam to be recovered may be degraded or the signal beam cannot be recovered. In the exemplary embodiment, the wavefront sensor 30 detects the wavefront aberration before recording and/or reproduction so that the wavefront aberration of the reference beam is corrected in need. In the case where the wavefront aberration of the reference beam is detected before recording and/or reproduction, for example, the wavefront aberration which exceeds the predetermined value is detected by the wavefront sensor, the wavefront of the reference beam is corrected so that the wavefront difference of the reference beam between the reproduction and recording is reduced.

It is to be understood that reproduction of the reference beam to be the same as the one for recording as much as possible is important. It is also important to generate the reference beam with the wavefront aberration as small as possible upon recording or reproduction. In the exemplary embodiment, in order to minimize the wavefront aberration of the reference beam upon recording or reproduction of the information, the wavefront aberration of the reference beam is corrected before recording or reproduction. Then the reference beam with smaller wavefront aberration is used for recording or reproduction. According to the exemplary embodiment, the reference beam is input to the wavefront sensor 30 before recording or reproduction. Based on the result, the reference beam with small wavefront aberration is generated using the reference beam wavefront control circuit 40 and the wavefront control element 60. Correction of the wavefront of the reference beam is not limited to the timing before recording or reproduction. The wavefront sensor 30 may be activated for detection during recording in parallel with the recording operation in need.

The embodiment may be structured as a holographic memory device which records an interference pattern generated by interfering a reference beam and a signal beam in a hologram recording medium as page data. The device includes a laser light source for emitting a laser beam, a beam splitter for splitting the laser beam emitted from the laser light source into the signal beam and the reference beam, a wavefront sensor for detecting a wavefront of the reference beam separated by the beam splitter, and a wavefront control element for correcting the wavefront of the reference beam in accordance with an output of the wavefront sensor. When recording information in the hologram recording medium, the interference pattern generated by interfering the signal beam separated by the beam splitter and the reference beam which has passed through the wavefront control element is recorded in the hologram recording medium. The holographic memory device further includes a control circuit for controlling output of the wavefront sensor. If the wavefront aberration of the reference beam is equal to or larger than the predetermined value, the interference pattern generated by the reference beam having the wavefront adjusted by the wavefront control element and the signal beam separated by the beam splitter is recorded in the hologram recording medium. The wavefront sensor may be configured to have a lens array as the condensing optical system.

The holographic memory device which reproduces recorded information from a hologram recording medium which records an interference pattern generated by interfering a reference beam and a signal beam as page data includes a laser light source for emitting a laser beam, a spatial light modulator for adding predetermined adjusting information to an optical beam emitted from the laser light source, an objective lens for guiding the optical beam to which the adjusting information is added by the spatial light modulator to the hologram recording medium, a wavefront sensor for detecting a diffraction beam of the optical beam, which is derived from the hologram recording medium, and a wavefront control element for correcting a wavefront of the reference beam in accordance with an output of the wavefront sensor. Information from the hologram recording medium is reproduced using the reference beam having the wavefront corrected by the wavefront control element. The predetermined adjusting information may be correlated with the information recorded in the hologram recording medium. Further, the wavefront sensor may be configured to include the lens array as the condensing optical system. The predetermined adjusting information may be preliminarily recorded in the hologram recording medium prior to reproduction.

What is claimed is:

1. A holographic memory device which records an interference pattern generated by interfering a reference beam and a signal beam in a hologram recording medium as page data, comprising:
   a laser light source which emits a laser beam;
   a beam splitter which splits the laser beam emitted from the laser light source into the signal beam and the reference beam;
   a wavefront sensor which detects a wave aberration of the reference beam separated by the beam splitter; and
   a wavefront control element which corrects for the wave aberration of the reference beam in accordance with an output of the wavefront sensor;
   wherein when recording information in the hologram recording medium, the interference pattern generated by interfering the signal beam separated by the beam splitter and the reference beam which has passed through the wavefront control element is recorded in the hologram recording medium;
   further comprising a control circuit which controls the wavefront control element in accordance with the output of the wavefront sensor;
   wherein when the wave aberration of the reference beam output from the wavefront sensor is equal to or larger than a predetermined value, the control circuit performs recording or reproduction using the reference beam having the wave aberration corrected by the wavefront control element.

2. The holographic memory device according to claim 1, wherein the wavefront sensor includes a lens array system.

3. The holographic memory device according to claim 1, wherein the reference beam is incident upon the wavefront sensor which detects the wave aberration of the reference beam incident thereon.

4. A reproduction method of reproducing information from a hologram recording medium which records an interference pattern generated by interfering a reference beam and a signal beam as page data, comprising the steps of:
   radiating an optical beam having a part of or all of information with respect to an amplitude distribution and a phase distribution of the signal beam used for recording the page data to a recorded region of the hologram recording medium via an optical system of the signal beam;
   calculating the phase distribution of the beam having the optical beam diffracted in the recorded region; and
   correcting the phase distribution of the reference beam upon reproduction based on the calculated phase distribution.

5. A reproduction method according to claim 4, wherein the page data contains a predetermined two-dimensional pattern.

6. A reproduction method of reproducing information from a hologram recording medium which records an interference pattern generated by interfering a reference beam and a signal beam as page data, comprising the steps of:
   radiating an optical beam having a part of or all of information with respect to an amplitude distribution and a phase distribution of a signal beam used for recording the page data to a recorded region of the hologram recording medium via an optical system of the signal beam;
   focusing a beam having the optical beam diffracted in the recorded region by an optical system;
   calculating the phase distribution of the diffracted beam through a focusing pattern; and
   correcting the phase distribution of the reference beam upon reproduction based on the calculated phase distribution.

* * * * *